PRINT EVALUATION AND EXPOSURE CONTROL SYSTEM

Filed Dec. 23, 1964 3 Sheets-Sheet 1

INVENTOR.
ROY A. JENSEN
BY John L. Jackson
ATTORNEY

Aug. 26, 1969 R. A. JENSEN 3,464,062

PRINT EVALUATION AND EXPOSURE CONTROL SYSTEM

Filed Dec. 23, 1964 3 Sheets-Sheet 2

PRINT EVALUATION AND EXPOSURE CONTROL SYSTEM

Filed Dec. 23, 1964 3 Sheets-Sheet 3

3,464,062
Patented Aug. 26, 1969

3,464,062

PRINT EVALUATION AND EXPOSURE CONTROL SYSTEM

Roy A. Jensen, San Jose, Calif., assignor to International Business Machines Corporation, New York, N.Y., a corporation of New York Filed Dec. 23, 1964, Ser. No. 420,712
Int. Cl. G06k *9/06, 9/02*
U.S. Cl. 340—146.3 3 Claims

ABSTRACT OF THE DISCLOSURE

An image evaluation system wherein control signals are generated which are indicative of the print characteristics of a subject image which signals may be utilized for exposure control. As a scanner scans across a document having print thereon, there is generated an analog signal the amplitude of which is proportional to the reflectance of the print as well as the background. This analog signal is operated on to determine average line width, average print reflectance, average background reflectance, and average rise time and these print characteristics are weighed in a weighing system in accordance with the weight to be given to each and are then summed in a summing circuit to provide an output signal which may be used for controlling an exposure parameter such as time.

This invention relates to image measurement and evaluation processes in general and more particularly to an online scanning and evaluation system for controlling exposure variables in a system wherein the input may be, for instance, either a microfilm image or a document type image.

As pointed out in a co-pending application by the same inventor, assigned to the assignee of the subject invention, entitled "Print Characteristics Displayer," Ser. No. 302,-516, now Patent No. 3,234,380, as a result of the recent intensive activity in document storage, transmission and display, a growing need has arisen for a means of quantitatively evaluating document and microimage characteristics. The above mentioned co-pending application describes a system for providing a quantitative evaluation of a document or microimage characteristic such that reliance on human judgment is to a large extent eliminated. The output, however, of this quantitative evaluation system is in the form of a trace or graph from which pertinent information relating to the input document can be taken. Obviously, such an output is not conducive to an on-line automatic control of exposure parameters. It would, of course, be desirable in a high throughput system to have a quantitative document and microimage control system which not only provides control of either light intensity or time depending upon the input quality of the document, but, additionally, provides a tool for determining the interrelation of certain document characteristics or variables and their effect on the duplication process.

As pointed out in the above mentioned co-pending application, in document storage systems precautions must be taken to insure that the documents introduced into storage will be readable upon retrieval. When these systems store images of documents, these precautions may take the form of insuring that the physical characteristics of the input documents can tolerate degradation introduced by the system or decreasing degradation introduced by the system, or some combination of these two. Thus, if the image storage system must handle documents ranging from printed, high contrast documents to smeared and smudgy carbon copies, some indication is needed as to whether or not images of questionable documents can be stored and retrieved. Without an objective indication or control, documents may be rejected, duplications of which would be readable at the output, or documents stored, duplications of which might not be readable at the output.

At present document quality is determined by having a person make a subjective judgment of document characteristics and perhaps even adjusting the processing procedure using this subjective judgment of document quality. Although these judgments may improve with practice and with the aid of guides, human judgments vary from observation to observation and from person to person. This variation can be attributed to the large number of variables which individually and collectively influence inter-document comparison. Examples of these variables include: object contrast, edge sharpness, contour gradient or blur, line width or stroke width, object size or type size, viewing distance, viewing angle, viewing time, ambient illumination, black versus white background, context of the material, style of type, format of material, spacing of type, past exposure to the material, alignment of type, manner of ink deposit, paper thickness, paper type, color differences, and depth of print impression on the paper.

This continuing use of subjective human judgment in systems which are designed to be flexible enough to handle a range of documents is due to the fact that an objective index of document characteristics prior ot the above mentioned co-pending application was lacking. Since documents with gross differences can be easily identified this lack of an objective index was probably most significant when an attempt was made to identify a cutoff point for document storage or when an attempt was made to manipulate the document storage processing procedure as a function of document characteristics. The rough viewing by a human operator of a document as well as the utilization of the graphical output of the heretofore mentioned co-pending application system both suffer from the limitation that, as the characteristics of the document approach a cutoff value, it takes the human evaluator an increasing amount of time to inspect the document or the graphical output and also a greater number of wrong judgments result. Likewise, compounding the problem is that often the operator has no way of telling whether he has made a mistake in judgment or whether the associated processing system has changed. These problems are eliminated by the hereinafter described novel system wherein no human operator intervention is required and a signal which can be utilized to control the exposure characteristics is presented based on parameters of the input document which have been determined to be of great importance such as print reflectance, background reflectance, edge sharpness, average print stroke width and average spacing between print stroke.

While subjective human judgment may often give a workable indication of document quality such that exposure variables may be set to provide an acceptable output, if the subject is a microimage, no such subjective human judgment can be utilized. In the field of microimages, exposure at present is set grossly on background while the information which is important is the print and therefore ideally the exposure should be set on the print. As is obvious, this would be very difficult. An exposure meter cannot provide an indication relative to the print since the print itself is very small.

It is therefore an object of the present invention to provide a novel automatic image evaluation system.

Another object of the present invention is to provide an image evaluation and control system wherein a control signal is available at the output which may be utilized to control exposure parameters.

Another object of the present invention is to provide an image evalution system wherein interrelationships of various document characteristics such as print reflectance, background reflectance, average stroke width, average distance between strokes and average edge sharpness can be determined with respect to ultimate output quality.

Other and further objects and advantages of the invention will be apparent from the following more particular description of the preferred embodiment of the invention, as illustrated in the accompanying drawings in which.

Briefly, there is provided an image evaluation system wherein control signals are generated which are indicative of the print characteristics of a subject image which signals may be utilized for exposure control. As a photocell aperture scanner scans across a document having print thereon, there is generated an analog signal the amplitude of which is proportional to the reflectance of the print as well as the background. This analog signal is operated on in the subject system to determine average line width, average print reflectance, average background reflectance, and average rise time and these print characteristics are weighted in a weighing system in accordance with the weight to be given to each and are then summed in a summing circuit to provide an output control signal for controlling an exposure parameter such as a time.

Figure 1:
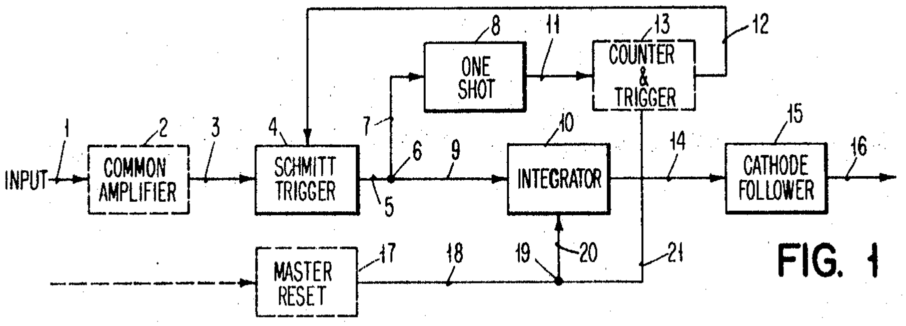
FIG. 1 is a block diagram of a system utilized to determine average pulse width.
Figure 3:
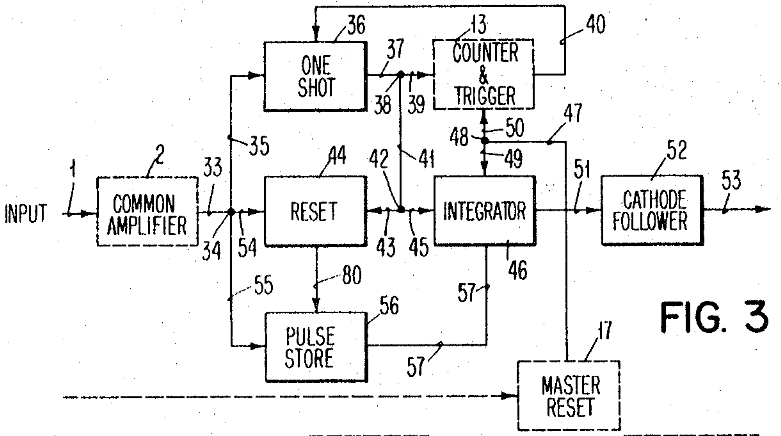
FIG. 3 is a block diagram of a system for determining average pulse height.
Figure 6:
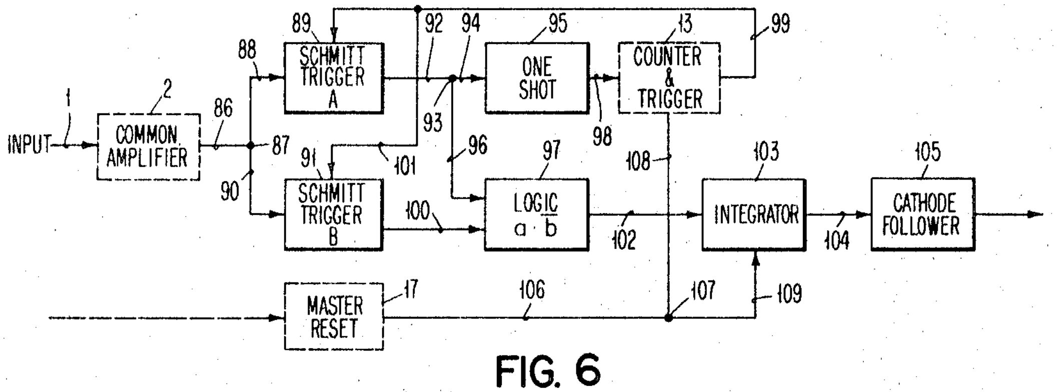
FIG. 6 is a block diagram of a system utilized to measure average pulse rise time.
Figure 9:
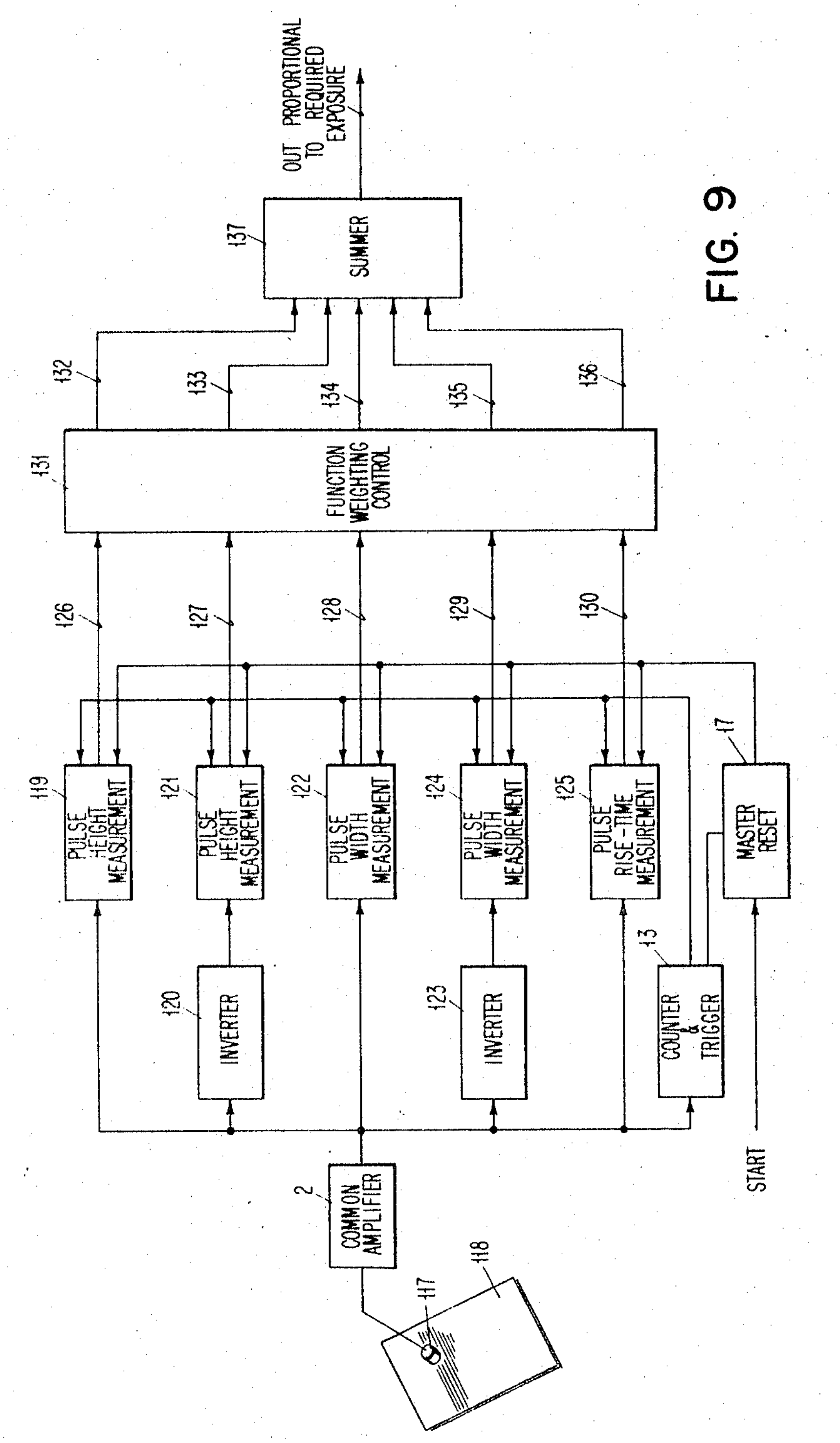
FIG. 9 is an overall block systems diagram of the hereinafter described subject print evalution and exposure control system.

As will hereinafter become obvious, certain of the components which are shown in block form in FIGS. 1, 3 and 6, are common. For instance, as shown in FIG. 9, there is a single amplifier, a single counter and trigger, and a single master reset.

For a more detailed description of the subject invention refer first to FIG. 1 wherein is shown in the input from the photocell along line 1 to the common amplifier 2, the output of which is fed along line 3 to a Schmitt trigger 4. The output of the Schmitt trigger 4 passes along line 5 to junction 6 which in turn is connected along line 7 to a one shot multivibrator 8 and along line 9 to an integrator 10. The output of the one shot multivibrator 8 is fed along line 11 to a common counter and trigger 13, the output of which is fed along line 12 back to the Schmitt trigger 4. The output of the integrator 10 is fed along line 14 to a cathode follower 15 having an output line 16, a master reset 17 is common to all of the circuits and has its reset signal set along line 18 to junction 19 which in turn is connected along line 20 to the integrator 10 and along line 21 to the counter and trigger 13.

In operation, the input signal which is an analog signal indicative of the reflectance from the document being scanned, a more detailed description of which is contained in the above mentioned copending application, is fed into the common amplifier 2. The common amplifier 2 functions to set the d.c. level and to also amplify the photocell signal. The incoming pulse turns on the Schmitt trigger 4 and the Schmitt trigger generates an output pulse along line 5 which is of fixed amplitude, but the duration or width of which varies in accordance with the width of the pulse received by the common amplifier 2. This output pulse from the Schmitt trigger 4 is integrated by the integrator 10. The pulse of the Schmitt trigger 4 also fires the one shot 8 which, again, generates a pulse of fixed amplitude ad fixed width which is passed along line 11 to the counter and trigger 13. The purpose of the counter and trigger 13 is to count a predeterminer number of input pulses and reset the system after this number of pulses has been counted. The reason for this particular technique is so that a single counter can be used. Thus, in the counter, an integrator such as the integrator of FIG. 2, which will hereinafter be more fully described, always integrates a pulse of fixed amplitude so that the charge on a capacitor reaches the same level with a given number of pluses and the trigger is then set to detect this level and feed a pulse along line 12 which inhibits the Schmitt trigger 4 from passing more pulses. Of course, other more elaborate counters, such as flip-flop counters, may be used.

The integrator 10 receives the pulses from the Schmitt trigger 4 which are of fixed amplitude, but the width of which varies in accordance with the width of the incoming pulses and integrates these pulses such that the total charge on the capacitor in the integrator is proporational to the average pulse width. This will become more clear in the explanation in connection with FIG. 2. The output of the integrator is taken by means of a cathode follower 15. As previously stated, this output or information content of the integrator is a charge on a capacitor. Therefore, a cathode follower is utilized since an emitter follower would drain a small amount of current from the capacitor. The master reset 17 is common to all of the circuit and may be manual or automatic. It is operable along lines 18, 20 and 21 to reset the integrator 10 and the counter and trigger 13 for another run.

Figure 2:
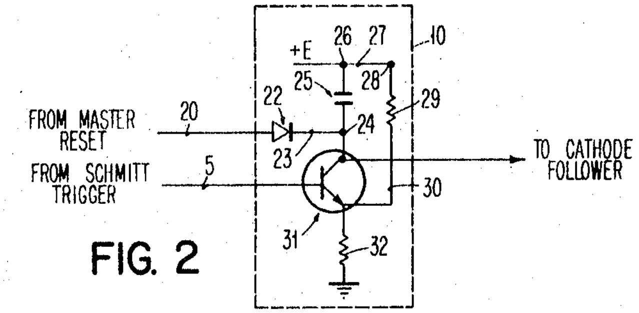
FIG. 2 is a schematic diagram of the integrator of the average pulse width measuring circuit of the system of FIG. 1.

In FIG. 2 is shown the integrator 10. The reset line 20 comes into the integrator 10 through a diode 22, the anode of which is connected to line 20 and the cathode of which is connected to line 23 which in turn is connected to junction 24. Junction 24 is connected to one side of the integrator capacitor 25, the other side of which is connected to junction 26, which is in turn connected to a +E supply. Junction 26 is also connected along line 27 to junction 28 which is connected to one side of a bias resistor 29, the other side of which is connected along line 30 to the emitter of transistor 31. The emitter of transistor 31 is also connected through resistor 32 to ground. The base of the transistor 31 is connected to the Schmitt trigger output line 5. In operation, the integrator 10 of FIG. 2 is reset by connecting line 20 by means of the master reset 17 to the +E supply such that there is no potential or charge on capacitor 25. The input pulses from the Schmitt trigger pass along line 5 to the base of transistor 31. The input pulses are of fixed amplitude and the width of the pulses varies in accordance with the width of the input print pulse to the system. The width, therefore, determines the amount of time that transistor 31 will be turned on and, consequently, the amount of charge which will be placed on capacitor 25 by each incoming pulse. Thus, after a selected number of pulses have been counted, the total charge on capacitor 25 will be proportional to the average pulse width. This charge on capacitor 25 is, as previously stated, then sampled by means of a cathode follower which, as will hereinafter be more fully described, goes into the overall system.

Resistors 29 and 32 function in the integrator 10 solely for biasing purposes and assure that the emitter of transistor 31 is above ground so that the transistor is turned off when the base goes to ground. The base, as is obvious, has to exceed a certain voltage before the transistor turns on, but it is always the same voltage and therefore the width of the incoming pulse will determine the voltage across the capacitor 25.

In FIG. 3 is shown a block diagram of a system for determining average pulse height for a train of random pulses. As will become obvious, the operation of the system as shown in FIG. 9 depends upon the analysis of the same number of pulses in the systems of FIGS. 1, 3 and is connected to the input of the logic circuit 97, the output of which is taken along line 102. As depicted in the block 97, the logic unit is an *a* not *b* logic unit, the function of which will be hereinafter more fully described. The output of the logic unit is taken along line 102 and fed to the integrator 103, the output of which is fed along line 104 and is taken by a cathode follower 105 in the same manner as in the circuits of FIGS. 1 and 3. Again, the purpose of the cathode follower is for sampling the capacitor in the integrator. Again, the master reset 17 is shown which provides a reset pulse along line 106 to junction 107 which is connected to the counter and trigger 13 along line 108 for resetting it and along line 109 to the integrator 103 for resetting the charge on the capacitor in the integrator.

Figure 8:
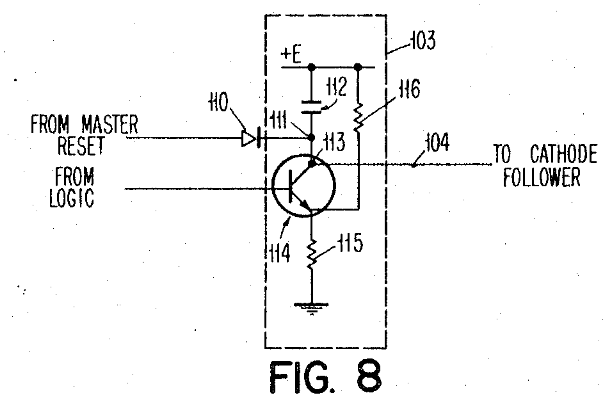
FIG. 8 is a schematic diagram of the integrator of the block diagram of FIG. 6.

In FIG. 8 is shown the integrator. The integrator is similar to the integrator of the circuit of FIG. 1 and includes a diode 110, the anode of which is connected to the master reset and the cathode of which is connected to junction 111, which is connected to one side of the integrator capacitor 112, the other side of which is connected to a +E supply. Junction 111 is also connected to junction 113 which in turn is connected to the collector of transistor 114, the base of which receives an input from the logic block 97 which is the *a* and not *b* logic. The emitter of transistor 114 is connected to ground through resistor 115. The emitter is also connected through resistor 116 to the +E supply. Again, the output from the integrator is taken from the collector by means of the cathode follower along line 104.

Figure 7:
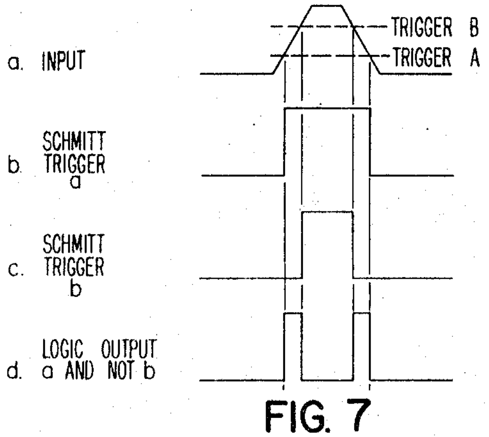
FIG. 7 is waveforms illustrative of the operation of the block diagram of FIG. 6.

For an operational description, refer both to FIGS. 6 and 7 which are the waveforms associated therewith. The circuit of FIG. 6 will provide or determine the average rise time of a number of pulses. As explained in the above mentioned co-pending application, average rise time corresponds to the edge sharpness, i.e., the transition from white to black. This transition is not an immediate transition since there is some finite distance involved. This is referred to as edge sharpness.

FIG. 7*a* shows an idealized incoming pulse which has sloping, leading and trailing edges indicative of edge sharpness. Dotted lines are shown at two levels. The trigger A level is the lower level and the trigger B level is the upper level. That is to say that trigger A is set to come on at the lower level of the pulse while trigger B is set to come on at the upper level of the pulse. As shown in FIG. 7*b*, the Schmitt trigger A comes on at a point corresponding to the lower level while, as shown in FIG. 7*c*, the trigger B comes on at a point corresponding to the upper level. When these pulses 7*b* and 7*c* are combined in a logic *a* and not *b* type circuit, the waveforms of FIG. 7*d* are provided which are two distinct pulses. These pulses are of constant amplitude. Thus, the amplitude of the two pulses of FIG. 7*d* is the same in all cases, but the width thereof depends on the rise and fall times of the input pulse. As is obvious, the faster the rising edge of the incoming pulse, the sooner Schmitt trigger B will fire and therefore the narrower the pulses will be. These two pulses are integrated in the integrator and at the end of the selected number of pulses in the run, the charge across the integrator capacitor 112 is proportional to the average rise and fall time of the incoming pulse which, as previously stated, corresponds to the edge sharpness of the print bars or subject matter scanned by the associated photocell.

In FIG. 9 is shown a block diagram of the overall system. FIG. 9 is included to illustrate certain basic obvious interrelationships between the print characteristics and certain manipulations which can be made thereon to provide control of exposure. The incoming pulse from the photocell 117 in scanning association with the document 118 is, as previously stated, amplified in the amplifier 2 and this pulse goes to the pulse height measurement system 119 directly and through an inverter 120 to the pulse height measurement system 121. It also goes directly to the pulse width measurement system 122 and through the inverter 123 to the pulse width measurement system 124. The function of the counter and trigger 13 to count the desired number of pulses and provide a control to stop the system from operating has already been described. The purpose of the inverter 120 is for inverting the incoming pulse from the amplifier prior to going through the pulse height measurement circuitry. As is obvious, the inverted pulse will give an average background reflectance measurement as distinguished from the uninverted pulse which will give the average print reflectance measurement. Again, the inverted pulse passing through inverter 123 will give the average distance between print crossings whereas the uninverted pulse, as previously described, will give the average pulse width associated with the print. The function of the pulse rise time measurement system has been described. The output of the pulse height measurement system 119, the inverted pulse height measurement system 121, the pulse width measurement system 122, the inverted pulse width measurement system 124, the pulse rise time system 125 are fed along lines 126–130 to a function weighting control system 131. The output from the function weighting control system 131 is fed along lines 132–136 into a summer 137. The output from the function weighting control system goes through the summer 137, the output of which will be a signal which can be utilized to control exposure.

The particular makeup of the function weighting control system 131 can take many various forms. One of the most straight-forward ways would be a voltage divider. However, a non-linear function such as a square measurement might be required. An ideal way would be to provide a voltage divider having a variable control thereon so that the effects of the various measurements provided in the system can be evaluated to determine what the proper settings are for the various functions which are being monitored. In certain operations it might very well be that some of the functions measured will not go into the output summer. Again, other times all may go into the output summer.

There are a number of functions which may be of use in the exposure control of a docment or of a piece of microfilm. Examples of these functions and the use thereof are as follows:

(1) The modulation transfer function of the camera-film combination used in making the copy may be used in conjunction with the measured line width of the document or film and the exposure adjusted using this function to correct the normal exposure one would compute from the measured contrast of the line or group of scanned lines.

(2) A summation of the resultant line contrasts on the receptor film can be computed using the measured contrasts and the Print Density H and D curve for the generation. This summation can be maximized for the measured input contrasts projected onto the Print Density H and D curve function.

(3) Another concept of exposure which can be computed from the equipment described, which has been experimentally determined to be of significance, is one of using the ¼ density point of the measured input contrast. This quarter density point is placed on the quarter density point of the receiver material. This latter point can be stored in the equipment and exposure computed to make these two density points coincide.

In the above described manner I have provided a novel automatic image evaluation system wherein a control signal is available at the output which may be utilized to control exposure parameters. Additionally, there has been provided an image evaluation system wherein interrelationships of various document characteristics such as print reflectance, background reflectance, average stroke width, average distance between strokes, average rise time, etc., can be determined with respect to ultimate output quality.

6. In FIG. 3 again is shown the input line from the photocell along line 1 into the common amplifier 2 which has its output fed in this case along line 33 to a junction 34. The junction 34 is connected along line 35 to the input of a one shot multivibrator 36, the output of which is fed along line 37 to junction 38. Junction 38 is connected along line 39 to the common counter and trigger 13, the output of which is fed along line 40 back to the one shot 36. Junction 38 is also connected along line 41 to junction 42 which is connected to the reset 44 along line 43 and to the integrator 46 along line 45. The integrator 46 is connected to a reset line 47 through junction 48 and line 49. The common counter and trigger 13 is likewise connected to junction 48 along line 50. The line 47 is energized by the reset signal from the master reset 17. The output of the integrator 46 is fed along line 51 to the cathode follower 52 which has its output taken along line 53. Cathode follower 52 functions in the same manner as the cathode follower of FIG. 1 and is utilized to sample the charge on the capacitor and the integrator 46.

Junction 34, which is connected along line 33 to the common amplifier 2, is also connected to the reset 44 along line 54 and it is connected along line 55 to the pulse store 56. The output of the pulse store 56 is connected along line 57 to the integrator 46.

The purpose of the system of FIG. 3 is to first determine that there is a pulse and then pick off the amplitude which is to be measured and stored until the next pulse comes through. The height of each pulse adds a little to the charge on the capacitor in the integrator 46. The accumulated charge on the capacitor in the integrator will then be proportional to the average height of the pulses. As stated with respect to FIG. 1, the input pulse comes in through the common amplifier 2 which sets the D.C. level and gives more amplitude than is available from the photomultiplier tube. The main signal path is along line 55 to the pulse store 56 which picks off the amplitude of the pulse. The pulse charges up a capacitor in the pulse store 56 which will be explained in more detail with respect to FIG. 4. The pulse from the common amplifier 2 is also fed along line 35 to the input of one shot 36 which generates an internal pulse. The negative going portion of the incoming pulse triggers the one shot while the positive going portion of the input pulse does not affect it. This is so that the peak amplitude of the incoming pulse is captured before the measurement is made. The common amplifier 2 and one shot 36 are D.C. coupled so that the rate of change does not matter, i.e., a slow falling pulse will still suffice. Each incoming pulse generates the internally generated pulse from the one shot, the amplitude and width of which is fixed. This output or internally generated pulse is fed from the one shot along line 37 and line 41 to the input of integrator 46 as well as along line 39 to the counter and trigger 13 which, as stated with respect to FIG. 1, inhibits the one shot from passing pulses once the set number of pulses has been counted. The internally generated pulse from the one shot is fed along line 37 and line 41 into the integrator 46 which also receives a pulse from the pulse store 56 along line 57. The charge in the pulse store 56 determines the amount of the internally generated pulse from the one shot 36 which will be integrated. In FIG. *5a* is shown the input pulse from the common amplifier 2 and in FIG. *5b* is shown the internally generated pulse which, as will be noted, rises on the falling edge of the pulse of FIG. *5a*. In FIG. *5c* is shown the input pulse of FIG. *5a* inverted and the internally generated pulse of FIG. *5b*. These two pulses are combined in the integrator and pulse store 56 and the amount of the internally generated pulse of FIG. *5b*, which is integrated, is controlled by the amplitude of the charge in the pulse store 56. The operation of this integration and pulse storing will become more clear from a consideration of FIG. 4.

Figure 4:
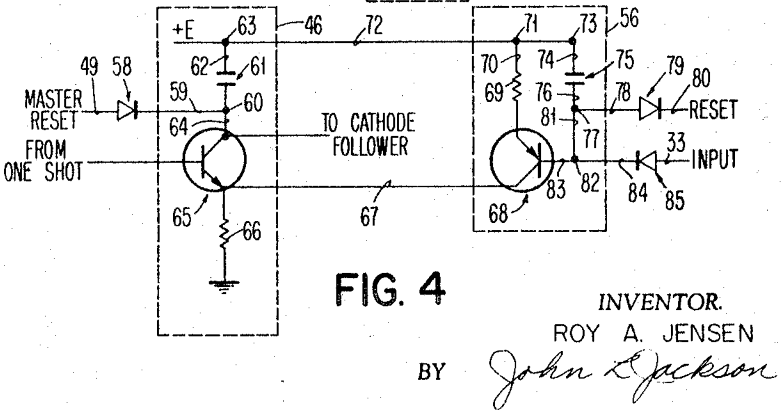
FIG. 4 is a schematic diagram of the integrator and pulse store of the block diagram of FIG. 3.
Figure 5:
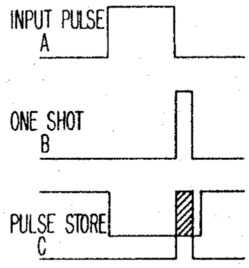
FIG. 5 is timing waveforms illustrative of the operation of the block diagram of FIG. 3 and schematic of FIG. 4.

In FIG. 4 is shown a diode 58 having its anode connected along line 49 to the master reset and its cathode connected along line 59 to junction 60 which is connected to one side of a capacitor 61 which is the integrator capacitor. The other side of capacitor 61 is connected along line 62 to line 63 which is connected to a +E supply. Junction 60 is also connected along line 64 to the collector of transistor 65, the base of which is connected to the one shot of FIG. 3. The emitter of transistor 65 is connected through resistor 66 to ground. The collector of transistor 65 is also connected to the cathode follower 52 of FIG. 3 from which the output of the integrator is taken.

The emitter of transistor 65 is also connected along line 67 to the collector of transistor 68 in the pulse store 56. The emitter of transistor 68 is connected to resistor 69 and along line 70 and junction 71 to the +E supply line 72. The +E supply line 72 is also connected to the junction 73 and line 74 to one side of the charge store capacitor 75, the other side of which is connected along line 76 to junction 77. Junction 77 in turn is connected along line 78 to the anode of diode 79, the cathode of which is connected to the reset 44 of FIG. 3 along line 80. Junction 77 is also connected along line 81 to junction 82 which is connected along line 83 to the base of transistor 68. Junction 82 is also connected along line 84 to the cathode of diode 85, the anode of which is connected to the input line 33.

In operation, the capacitor 75, which is the pulse store capacitor, is fully charged initially by grounding the cathode of diode 79 through a trigger or other means not shown such that +E is placed across the capacitor 75. The input pulse comes in through diode 85 and discharges capacitor 75 by an amount proportional to it. The charge on capacitor 75 is maintained thereon and is measured by transistor 68 and a voltage proportional to it is transferred along line 67 to the emitter of transistor 65 in the integrator 46. This is the elongated inverted pulse of FIG. *5c*. The incoming pulse gets its inversion from going through transistor 68. Thus, the emitter of transistor 65 is set. The base of transistor 65 is connected to the one shot and transistor 65 turns on when the voltage on the base exceeds that on the emitter. The setting of the emitter therefore determines the amount of incoming pulse which will be integrated as illustrated in FIG. *5c*. As is obvious, the heart of the circuit of FIG. 4 is the technique of setting the emitter of transistor 65 by the incoming pulse and having the fixed internally generated pulse coming into the base thereof.

When transistor 65 turns on, a certain amount of charge is placed across capacitor 61. As each incoming pulse comes in, the voltage on capacitor 61 is changed proportionally to the amplitude of each pulse until the fixed number of pulses has been integrated and there is then a fixed voltage across capacitor 61 which can be taken by the cathode follower to provide an output from the integrator 46.

The integrator capacitor 61 is reset by means of the master reset which, by means of a trigger or other means not shown, applies a +E potential to the anode of diode 58 such that there is no charge across capacitor 61.

In FIG. 6 is shown a system for providing the average rise time of a number of randomly occurring pulses. The input, as with respect to the system circuits of FIGS. 1 and 3, is along line 1 from the photocell and through amplifier 2, which again sets the D.C. level and amplifies the signal from the photocell. The output of the amplifier is along line 86 to junction 87 which is connected along line 88 to a Schmitt trigger A89 and along line 90 to a Schmitt trigger B91. The output of Schmitt trigger A is along line 92 to junction 93 which is connected both along line 94 to a one shot 95 and along line 96 to a logic circuit 97. The output of the one shot is along line 98 to the common counter and trigger 13, the output of which is taken along line 99 back to the Schmitt trigger A.

Schmitt trigger B has its output taken along line 100 and also receives a reset or blocking pulse from the counter and trigger 13 along lines 99 and 101. Line 100

In summary, there has been provided an image evaluation system wherein control signals are generated which are indicative of the print characteristics of a subject image which signals may be utilized for exposure control. As a photocell aperture 117 scans across a document 118 having print thereon, there is generated an analog signal the amplitude of which is proportional to the reflectance of the print as well as the background. This analog signal is operated on in the subject system to determine average line width, average distance between lines, average print reflectance, average background reflectance, and average rise time and these print characteristics are provided to a weighting system wherein wieghts may be assigned thereto and the output of the weighting system is then summed in a summing circuit to provide an output control signal for controlling an exposure parameter or parameters.

While the invention has been particularly shown and described with reference to a preferred embodiment thereof, it will be understood by those skilled in the art that various changes in the form and details may be made therein without departing from the spirit and scope of the invention.

What is claimed is:

1. A system wherein signals are generated which are indicative of the image quality of the subject image composed of print areas and background areas, said system comprising:

scanning means in scanning association with said subject image operable to generate an analog signal having a number of pulses the instantaneous amplitude of which is proportional to the reflectance of said subject image, means for measuring the height of the pulses generated as said scanning means scans the print areas of said subject image and providing a voltage proportional to the average height of the pulses, means for measuring the height of the pulses generated as said scanning means scans the background areas of said subject image and providing a voltage proportional to the average height of the pulses, means for measuring the width of the pulses generated as said scanning means scans the print areas of said subject image and providing a voltage proportional to the average height of the pulses, means for measuring the width of the pulses generated as said scanning means scans the background areas of said subject image and providing a voltage proportional to the average height of the pulses, pulse rise time measurement means connected to said scanning means for providing a voltage proportional to the average rise time of the pulses from said scanning means, and counting means connected to said scanning means and to said print and background pulse height measurement means, to said print and background pulse width measurement means, and to said pulse rise time measurement means.

2. A system wherein signals are generated which are indicative of the image quality of the subject image composed of print areas and background areas, said system comprising:

scanning means in scanning association with said subject image operable to generate an analog signal having a number of pulses the instantaneous amplitude of which is proportional to the reflectance of said subject image, means for measuring the height of the pulses generated as said scanning means scans the print areas of said subject image and providing a voltage proportional to the average height of the pulses, means for measuring the height of the pulses generated as said scanning means scans the background areas of said subject image and providing a voltage proportional to the average height of the pulses, means for measuring the width of the pulses generated as said scanning means scans the print areas of said subject image and providing a voltage proportional to the average height of the pulses, means for measuring the width of the pulses generated as said scanning means scans the background areas of said subject image and providing a voltage proportional to the average height of the pulses, pulse rise time measurement means connected to said scanning means for providing a voltage proportional to the average rise time of the pulses, counting means connected to said scanning means and to said print and background pulse height measurement means, to said print and background pulse width measurement means, and to said pulse rise time measurement means, weighting and summing means connected to said print and background pulse height measurement means, to said print and background pulse width measurement means, and to said pulse rise time measurement means.

3. The apparatus of claim 2 wherein said weighting means is a voltage divider including a variable resistor for each function to be weighed.

References Cited

UNITED STATES PATENTS

| | | | |
|---|---|---|---|
| 3,127,505 | 3/1964 | Gustavson | 235—92 |
| 3,315,229 | 4/1967 | Smithline | 340—146.3 |
| 3,345,502 | 10/1967 | Berg | 235—92 |

MAYNARD R. WILBUR, Primary Examiner

SOL SHEINBEIN, Assistant Examiner

U.S. Cl. X.R.

235—92; 307—106; 328—108